United States Patent [19]

Hildebrandt

[11] 4,177,962
[45] Dec. 11, 1979

[54] WINDING-IN DEVICE FOR VEHICLE SAFETY BELTS

[76] Inventor: Eckhard Hildebrandt, 31 Bardseyring, 2359 Kisdorf, Fed. Rep. of Germany

[21] Appl. No.: 907,021

[22] Filed: May 17, 1978

[30] Foreign Application Priority Data

May 20, 1977 [DE] Fed. Rep. of Germany ....... 2722744

[51] Int. Cl.$^2$ .................... A62B 35/02; B65H 75/48
[52] U.S. Cl. .................................. 242/107.4 B
[58] Field of Search ............... 242/107–107.7; 297/388; 280/744–747

[56] References Cited

U.S. PATENT DOCUMENTS

| | | | |
|---|---|---|---|
| 3,787,002 | 1/1974 | Hayashi et al. | 242/107.4 B X |
| 3,905,562 | 9/1975 | Kell | 242/107.4 B X |
| 4,083,512 | 4/1978 | Rumpf | 242/107.4 B X |

FOREIGN PATENT DOCUMENTS 2145077  3/1973  Fed. Rep. of Germany .... 242/107.4 B

*Primary Examiner*—Harvey C. Hornsby
*Assistant Examiner*—John M. Jillions

[57] ABSTRACT

This invention relates to winding-in devices for automobile safety belts of the kind having a shaft, rotatably mounted in a housing to receive the safety belt, which is withdrawable, and having locking means by which said shaft is locked against further rotation in the withdrawal direction when a predetermined limiting level of angular acceleration is exceeded, and further having an inertia body, rotatable on and with said shaft, which, when said limiting level is exceeded, lags behind the rotary movement of said shaft in opposition to the effect of spring means which connect it to said shaft, in order to bring a least one locking pawl, which is mounted to pivot in a flange on said shaft, into engagement with a ring of teeth secured to said housing via a cam track.

According to the invention, the locking pawl is inset in the flange on the shaft, and is connected to said flange by means of a pivot mounting having a bearing means. Furthermore, the end region of the locking pawl opposite the pivot mounting carries an actuating pin parallel to the axis of the device which engages in an actuating slot in the inertia body, the slot forming the cam track. Each actuating slot may follow a path along an arc of a circle eccentric to the inertia body.

9 Claims, 7 Drawing Figures

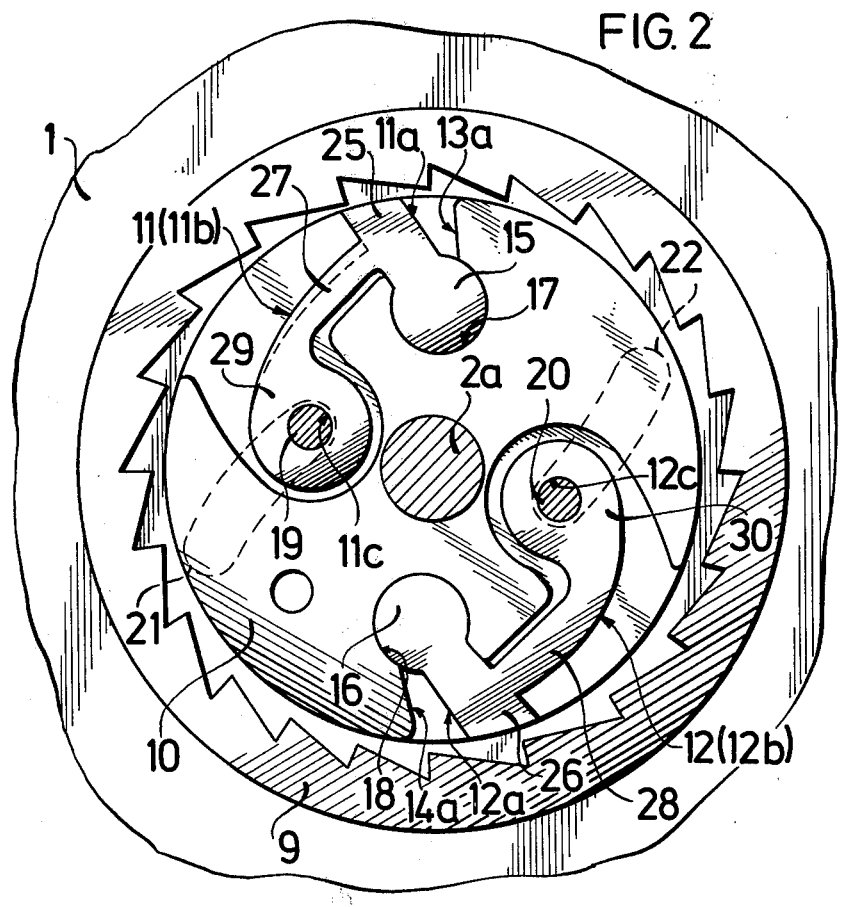

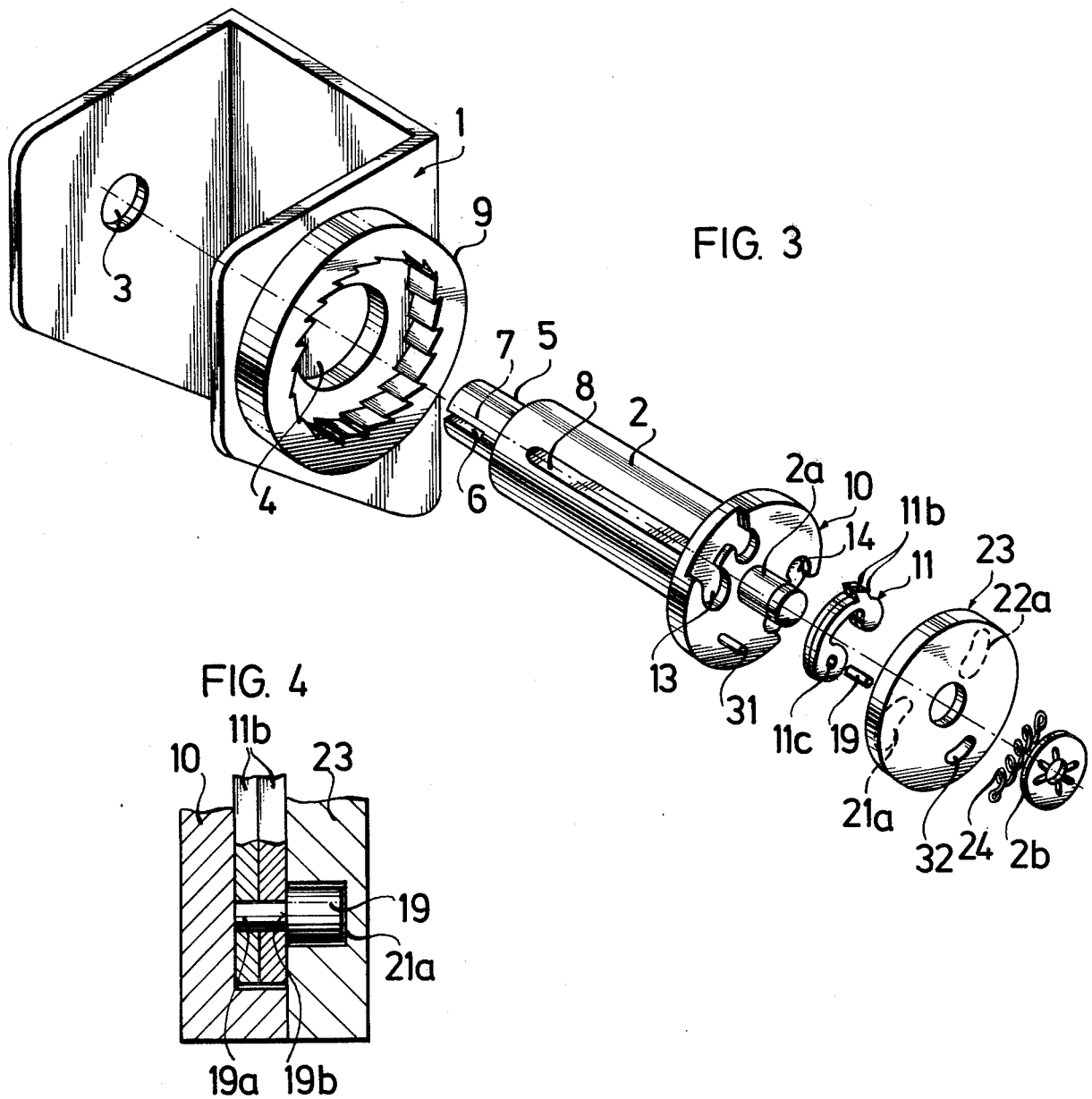

WINDING-IN DEVICE FOR VEHICLE SAFETY BELTS

BACKGROUND OF THE INVENTION

The present invention relates to a winding-in device for safety belts in motor vehicles, of the kind in which said device has a shaft, rotatably mounted in a housing of the device, to receive the safety belt, which in withdrawable, and having locking means by which the shaft is locked against further rotation in the withdrawal direction when a predetermined limiting level of angular acceleration is exceeded, and further having an inertia body, rotatable on and with the shaft, which, when the said limiting level is exceeded, lags behind the rotary movement of the shaft in opposition to the effect of spring means which connect it to the shaft, so that, in so doing, it can bring at least one locking pawl, which is mounted to pivot in a flange on the shaft, into engagement with a ring of teeth secured to the housing via a cam track. Hereinafter such a device will be referred to as "of the kind described".

In the case of known winding-in devices, a distinction can, in principle, be made between two different kinds of direct acting locking means. With one kind the locking means respond, when the speed of rotation of the shaft exceeds a specified value, by for example causing a locking member connected to the shaft to move outwards under the promoting of the centrifugal force which acts on it and allowing to come it into engagement with a fixed ring of teeth or a fixed projection. The disadvantage of this design lies above all in the fact that the locking speed may be reached as soon as the belt begins to be pulled out or even if the person held in the belt bends forward fairly quickly without being caused to do so by an accident, thus causing the lock to function unnecessarily.

A change has therefore already been made to allow the locking means to operate in response to the angular acceleration of the shaft carrying the belt, a specific critical value being set above which the lock comes into action. This would be the case if, say, the belt were pulled out with a jerk, whereas otherwise the belt can, in principle, be pulled out from the shaft at any desired speed without locking taking place.

Belt reels fitted with locking means of this kind have for example an inertia body rotatably mounted on the shaft which may be connected to the shaft by a traction spring and which in normal operation travels with the shaft in the same direction of rotation. If however the shaft is turned with an angular acceleration which exceeds the preset limiting value, the inertia body lags behind the shaft in opposition to the traction spring which is pulling it along with the shaft. The relative rotation which thus occurs is made use of to pivot a locking pawl about a mounting point, via levers, linkages, gears or the like, until a locking tooth on the pawl can come into positive engagement with a ring of teeth secured to the housing and can prevent further rotation of the shaft.

It is an object of the invention to improve winding-in devices of the kind described so that they shall be easy to assemble, reliable in operation and compact in construction.

SUMMARY OF THE INVENTION

Accordingly, the invention consists in a winding-in device of the kind described wherein said locking pawl is inset in said flange on said shaft, and is connected to said flange by means of a pivot mounting having a bearing means, and in that the end region of said locking pawl opposite from said pivot mounting carries an actuating pin parallel to the axis of the device which engages in an actuating slot in said inertia body, said slot forming said cam track.

The cam track may be curved or straight. It is useful for the locking pawl to have a mounting head in the form of a part disc, which disc is held against radial movement by a bearing space of corresponding part-circular configuration forming part of the recess and, in conjunction with this space, forms the pivot mounting.

This construction thus dispenses with the mounting pin for the locking pawl which in other cases has to be provided on the flange and which often breaks under heavy loads. In addition the load-bearing faces of the pivot mounting are relatively large since virtually the entire circumference of the mounting head can come to bear against the recess, which means that the locking tooth, which is situated in the region of the mounting head, and thus the locking pawl will have a support capable of accepting heavy loads, particularly in the locking position.

Also, the locking pawl may be mounted in such a way that it can be inserted in its recess from a side-face of the flange without any special care having to be taken to line up mounting pins and mounting holes. Since the axial depth of the recess can correspond substantially to the thickness of the locking pawl, which is in the form of a stamped part, and since the locking pawl is thus entirely contained in its associated recess, the axial extent of the complete device is not affected by the thickness of the locking pawl, which inter alia is conductive to the desired compactness of construction. A further factor which assists to this end is that the inertia body, which is preferably in the form of a disc, can be arranged immediately next to the flange on the shaft, since the actuating pin on the locking pawl is intended to engage directly in the actuating slot situated in the inertia body.

In the event of an accident, the locking mechanism is generally subjected to extreme stress by the weight of the person who is then thrown forward and it may even be damaged to some degree as a result of the locking pawl or the mounting pin being bent for example, or the locking tooth or the ring of teeth secured to the housing being damaged. Since this does not necessarily make the mechanism itself incapable of functioning, the user will be unable to recognise that a dangerous defect exists and thus that the winding-in device is no longer capable of withstanding heavy loads or that in fact the locking mechanism will no longer operate effectively.

To avoid this danger, any locking pawl according to the invention may be made of a size and shape such that it fractures under a preselected load while preserving the locking interengagement.

For this purpose, a web which connects the end regions of the locking pawl may for example be made smaller in size than the other parts of the pawl to form an intended break point. Then, if a part of the outwardly curved web comes to bear against the ring of teeth under loads of this kind as a result of material deformation, and if the locking tooth directly adjoins the mounting head region, then under such excessive loading the locking pawl will break in the region defined by the transition from the web to the locking tooth. The actual locking action is not affected by this.

The pieces of a broken locking pawl will put the winding-in device as a whole out of action and the user will thus easily recognise that the device needs to be replaced. He will be able to recognise this for example from the fact that the device will no longer reel in the belt, which is attributable to the fact that the locking tooth of the broken pawl has jammed in the opposing teeth of the ring or has dug into them.

BRIEF DESCRIPTION OF THE DRAWINGS

In order that the invention may be more clearly understood, reference will now be made to the accompanying drawings, which show one embodiment thereof by way of example and in which:

FIG. 2 is a cross-section of the device shown in FIG. 1, FIG. 3 shows a modified version of the embodiment of FIG. 1, FIG. 4 is an axial section through one end of a locking pawl as shown in FIG. 3 to an enlarged scale.

DETAILED DESCRIPTION OF A PREFERRED EMBODIMENT

Figure 1:
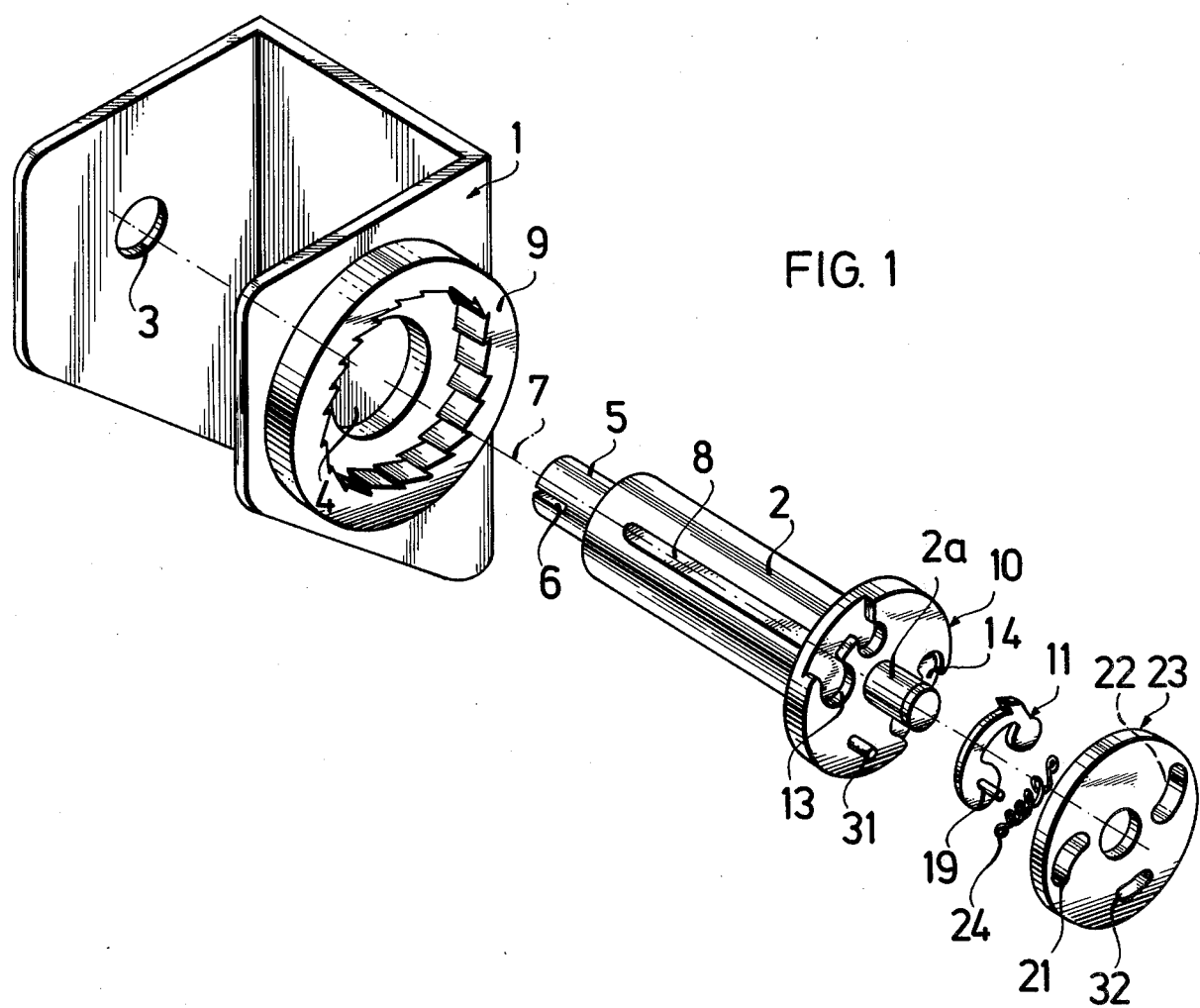
FIG. 1 is an exploded perspective view of a selected embodiment of the invention.

Referring now to the drawings, FIG. 1 shows a shaft 2 which can be rotatably mounted in the conventional fashion in a housing 1, which is intended to be suitably secured to the bodywork of a vehicle, the shaft being mounted in two holes 3 and 4 in the sidewalls of the housing, which is substantially U-shaped. A reduced-diameter end 5 of the shaft 2 projects outwards through the bore 3 and at this point engages by means of a transverse slot 6 with the end of a spiral spring (not shown in this Figure) which tends to turn the shaft about its longitudinal axis 7 in the pulling-in direction, i.e in the clockwise direction in FIG. 1. The shaft 2 also contains a longitudinal slot 8 in which the end of the seat belt is fastened.

On the outside of one wall of the housing is provided an internally-toothed ring 9 which constitutes the ring of teeth secured to the housing and which surrounds a flange 10 on the shaft 2. Two locking pawls 11 and 12 can be brought into engagement with the ring of teeth so that, in a manner hereinafter to be explained, the shaft 2 can be immobilised to prevent the seat belt from being unreeled. In FIG. 1 only one of the locking pawls is shown for simplicity and greater clarity.

The two locking pawls are situated in respective recesses 13 and 14 which lie diametrically opposite one another in the flange 10 and into which the locking pawls are inserted from the side. The locking pawls have mounting heads 15, 16 (FIG. 2) at one end which are part circular in shape and which each fit into correspondingly shaped bearing spaces 17, 18 forming part of the recesses 13, 14, the perimeters of the bearing spaces extending round the mounting heads for a distance such that on the one hand the mounting heads are held against radial movement, but on the other hand the locking pawls 11, 12 are allowed adequate pivoting movement about the pivot mountings formed by parts 15, 16 and 17, 18.

Opposite these pivot mountings at the other ends of the locking pawls are provided actuating pins 19, 20 parallel to the axis of the device, which engage in actuating slots 21, 22 in a disc-shaped inertia body 23. As shown in the drawings, the actuating slots and thus the cam tracks follow paths along arcs of circles eccentric to the inertia body. The inertia body 23 is mounted to rotate on an axial projection 2a from the shaft, a traction spring 24 which operates between the flange 10 on the shaft and the inertia body 23 causing the inertia body to follow the shaft in its rotation.

Each locking pawl 11, 12 preferably has a single locking tooth 25, 26 having a radially or substantially radially extending flank, which bears against a flank of one of the associated teeth in the ring 9 in the locking position. In addition, the locking teeth are arranged to project outwards from the area occupied by the mounting heads 15, 16, the latter being connected by a relatively narrow curved web 27, 28 to the other end region 29 or 30 of the locking pawl, this region in turn carrying the actuating pin 19 or 20.

The way in which the winding-in device which has been described operates is as follows: when the belt is pulled off the shaft 2 at an even angular speed or with an angular acceleration which is below the critical value for angular acceleration, the spring 24, assuming it to be of a suitable size, will apply sufficient tractive force to cause the inertia body 23 to rotate in synchronisation with the shaft 2.

If however, as a result of the seat-belt being pulled out with a jerk for example, the shaft 2 is turned with an acceleration above the said limiting value, then because of its inertia the inertia body 23 lags behind the rotary movement of the shaft 2 in opposition to the action of the spring 24. There is thus relative movement between the flange 10 and the inertia body 23 with the result that the actuating pins 19 and 20, which bear against the inner cam faces of the actuating slots 21, 22 indicated in broken lines in FIG. 2, are moved outwards, the locking pawls 11, 12 being pivoted about their mounting and the locking teeth 25, 26 coming into engagement with the ring of teeth opposite them.

In this way the shaft 2 is locked to the ring secured to the housing via the flange and the locking pawls and the seat-belt thus cannot be pulled out any further. This locked state automatically comes to an end when there is no longer a pull on the seat-belt and the spiral spring engaging with the end 5 of the shaft can again turn the shaft 2 in the winding-in direction.

Also situated on the flange 10 is a pin 31 parallel to the axis of the device which engages in slot 32 in the inertia body 23. The length of the arc covered by this slot, which extends concentrically to the axis 7, determines the amount by which the inertia body 23 and the flange 10 can turn relative to one another. Also, for purposes of simplification, one end of the spring 24 may be secured to the pin 31 while the other end of the spring may be secured to a pin or projection which is situated on the side of the inertia body 23 which is to the rear in the drawing. The appropriate face of the inertia body is also provided with a suitable cavity to accommodate the spring 24.

In the case of the embodiment shown, and also in the case of other possible embodiments, the locking pawls 11 and 12 may, in accordance with the invention, be of a size and shape such that they break under a predetermined load or when this load is exceeded but allow the locking interengagement to be maintained once this has taken place. The load in question may be defined using the values laid down in the so-called ECE European standard or in other standards for dynamic testing.

As can be seen from the drawings, the webs 27, 28 which connect the end parts 15, 16 and 29, 30 of the locking pawls and which follow an outwardly curved path are smaller in size than the other parts of the pawl, thus defining an intended break point here. When the locking pawls 11, 12 are situated in the locking position, the faces 11a, 12a of the pawls will bear against radially or substantially radially extending abutment faces 13a, 14a, which form buttresses and which each continue from one end of the bearing spaces 17, 18. Under excessive loads, such as occur in the dynamic test mentioned for example, the buttress faces 13a, 14a of the flange 10, which may consists of die cast zinc for example, will be deformed, with the result that when this happens the curved webs 28, 27 will move further outwards radially and will make contact with the internal teeth of the annular body 9.

This means that there is a lever formed between substantially the area of contact and the area where the webs 27, 28 merge with the locking teeth 25, 26. It can therefore be expected that the desired break in the material will occur at the latter point even if the webs are of uniform thickness throughout their extent. The mounting heads 15, 16 and the locking teeth 25, 26 will thus continue to form a continuous part despite the fracture, and the locking action will thus continue to be effective, especially in view of the fact that the locking teeth will have dug into the deformed material of the internal teeth to a considerable extent.

In order that the position of the required break point can be more closely fixed, instead of being made of uniform thickness in cross-section, the webs may be so formed that their minimum cross-section occurs at the transition into the adjoining locking teeth 25, 26. This possibility is indicated in broken lines on locking pawl 11 in FIG. 2. Finally, it would also be possible to provide the webs 27, 28 with indentations or other weakenings at the precise point where the fracture is intended to occur under the conditions of load described above.

It should also be mentioned that the winding-in device could also operate with only one, or more than two locking pawls. Furthermore, it would also be possible for each locking pawl to be provided with more than one locking tooth. It should also be pointed out that instead of mounting the locking pawls by means of a disc, a pivot mounting of some other design could be used. As an example a mounting pin could be fitted to the flange 10 to engage in an associated hole in the locking pawl.

As is shown in the Figures, the actuating slots and thus the actuating tracks follow paths along arcs of circles eccentric to the inertia body. Alternatively, the actuating slots may follow straight or part-elliptical or similar paths.

Furthermore, the possibility may also be considered of forming the actuating slots 21, 22 not in the inertia body 23 but in the locking pawls 11, 12, in which case the actuating pins 19 would be situated on the inertia body 23. Although this is a technically equivalent arrangement to the embodiment described, the embodiment illustrated is preferable since it has evident advantages from the point of view of manufacture and in respect of the compactness of the device.

If the locking pawls are produced by stamping, it will be found useful, as illustrated by the embodiment shown in FIG. 3, for the pawls 11, 12 to be assembled from at least two parts 11b, or 12b which are of the same outline shape and preferably of the same thickness. This gives an opportunity for the parts or halves of the pawls to be stamped from relatively thin material, so that a rough stamping process can be used in places of a more expensive precision stamping operation. A further advantage in this construction is that the tools for rough stamping are cheaper to make. For the sake of greater clarity, only the arrangement of the parts 11b of locking pawl 11 is shown in FIG. 3.

To form a complete locking pawl, the parts of the pawl may be connected together by bonding. A further advantageous possibility is for the parts of the pawl to be connected together by means of a grooved pin or spring pin having outwardly projecting parts which at the same time form the actuating pin 19, 20. It will also be appreciated that the parts of the pawl must be provided with holes in the end regions 29, 30 in a preliminary stamping operation so that the grooved or spring (expansion) pins can then be suitably pressed or driven into the holes.

In a further improvement of the embodiment shown in FIG. 3, the actuating pins 19, 20 may be a clearance fit in aligned bores 11c, 12c in parts 11b and 12b of the pawls. In this case, to secure the actuating pins axially, the actuating slots are in the form of grooves 21a, 22a as is indicated in broken lines in FIG. 3, so that the pins make contact with the floor of the grooves, while at the other end they are able to bear against the flange 10.

As an alternative, instead of bearing against the flange, the pins may bear against the pawls 11b, 12b themselves. For this purpose they have a reduced-diameter portion, e.g. portion 19a, which is a loose fit in the aligned bores in the locking pawls, and a step 19b in the pins rests against the pawls (FIG. 4).

The parts 11b, 12b, 19, 20, and 23 are held together by a spring washer 2b mounted on the projection 2a from the shaft. Then, if locking occurs, because the individual parts 11b, 12b of each locking pawl rest loosely against one another the further advantage exists that they are able to adjust themselves in the optimum fashion to the forces which arise.

The design illustrated in FIGS. 3 and 4 further simplifies the manufacture and assembly of the winding-in device because the locking pawls are particularly simple to produce and fit.

Figure 5:
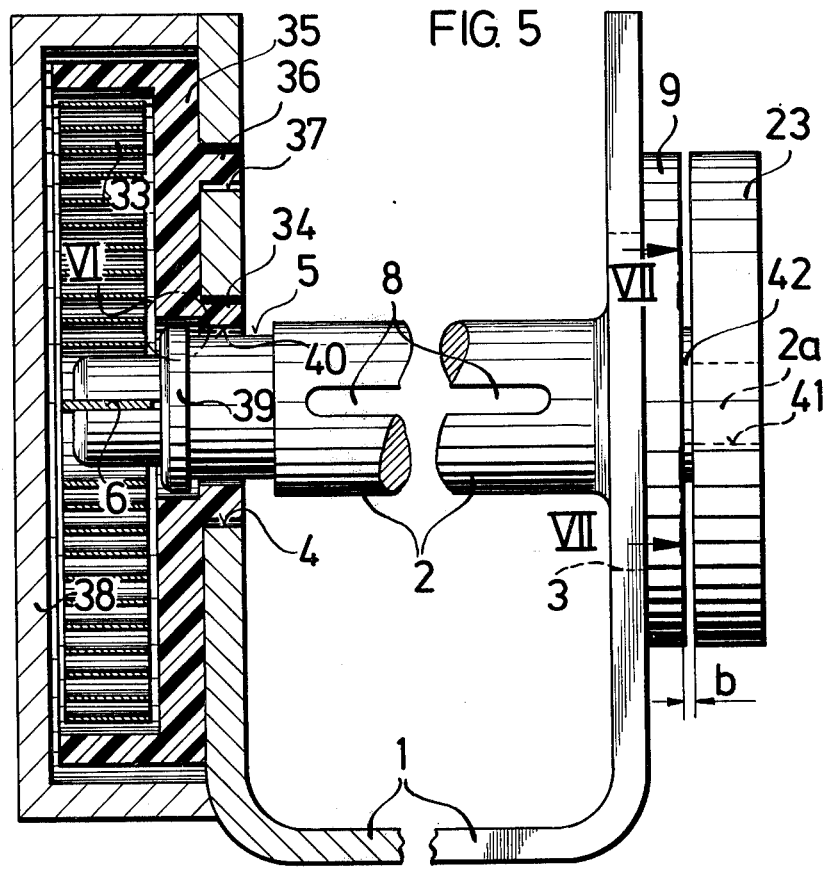
FIG. 5 is an elevation view, half in axial section, of a version of the embodiment of FIG. 1 which is further modified.
Figure 6:
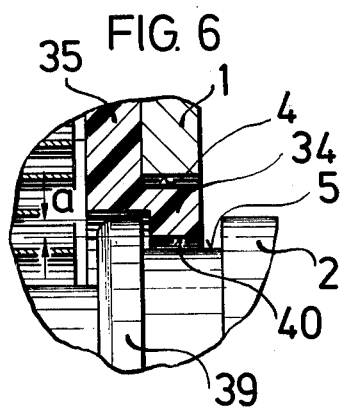
FIG. 6 shows the detail of FIG. 5 indicated at X, to an enlarged scale.
Figure 7:
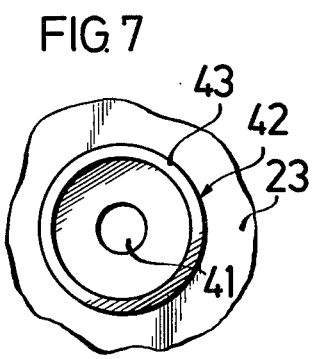
FIG. 7 is a side-view looking from line VII—VII in FIG. 5.

FIGS. 5 to 7 show a further embodiment in the assembled state.

The reduced diameter end-part 5 of the shaft 2 projects outwards through the bore 4 and at this point engages by means of the transverse slot 6 with the end of a spiral spring 33 which turn the shaft in the winding-in direction. One end of the seat belt, which is not shown, is fastened in the longitudinal slot 8.

On the reduced diameter end-part 5 of the shaft is mounted a boss 34 of a spring housing 35 in which the said spiral spring 33 is accommodated, and to which it is secured by its other end. The spring housing is prevented from turning by a pin 36 which engages in an opening 37 in the housing 1 of the device. The spring housing, which is composed of plastics material, and the spiral spring which it contains, are protected by a cover 38 which is secured to the housing 1 by means of screws for example.

In accordance with a feature of the invention, the end of the shaft adjacent the spring carries a continuous collar 39 extending in the circumferential direction which is of slightly larger diameter than the central bore 40 in the boss 34 of the spring housing 35. Thus, by taking advantage of the resilience of the material of the spring housing, it is possible to insert the end of the shaft adjacent the spring, together with the collar 39, through the bore 40 and the boss, the collar engaging behind the other edge of the bore 40 after being inserted through it, as is indicated in area X of FIG. 5 and as can be seen in greater detail in FIG. 6. The dimension a represents, to an enlarged scale, the difference in diameter between the collar and the bore in the boss. In addition, the axial and radial clearance between the boss and the reduced diameter end 5 of the shaft has been exaggerated merely for the sake of clarity. In the assembled state the spring housing 35 is thus engaged with the shaft 2 by parts of interfitting shape, so that the shaft is fixed in position axially in a simple fashion while preserving the requisite minimum clearance.

It is advantageous for the collar 39 to be rounded on the side on which the spring is situated, as is clearly shown in FIG. 6, so that it is easier to insert it through the bore 40 in the boss 34, while on the opposite side the collar has a sharp edge so that there is a relatively large area of contact between the collar and the boss to prevent the spring housing from jumping off the shaft.

In this embodiment the collar is continuous. It would of course also be possible for it to be interrupted and to consist for example of three segments or the like in order to provide adequate support for the spring housing.

In a further refinement of the proposed winding-in device, for example to reduce the overall friction in the system when the seat-belt is pulled out, the inertia body 23 is provided on the side adjacent the flange 10, in the vicinity of its central hole 41, with a distance piece 42 which holds the inertia body away from the flange at a distance b. In this way only a small area of the inertia body rests against the flange, which not only reduces friction but also reduces noise and in addition increases belt sensitivity. The latter is particularly important with so called one-way locking mechanisms.

A preferred embodiment of the distance piece 42 is shown in FIG. 7 where it comprises a concentric annular projection 43. The distance piece 42 may however also consist of individual projections which are arranged around the hole 41 at regular intervals, the individual projections being situated diametrically opposite one another in cases where there are only two of them. The individual projections may be parts of a ring but may also be of other shapes. What is important is that they project by the same amount axially.

As an alternative it is possible for the distance piece 42 to be provided on the flange 10.

I claim:

1. In a winding-in device for safety belts of motor vehicles, the device being of the type including a housing provided with a ring of teeth, a shaft having a flange, rotatably mounted in said housing for receiving a safety belt, a locking pawl pivotably mounted on said flange for engagement with said ring of teeth, an inertia body rotatable on and with said shaft, spring means for connecting said inertia body to said shaft, said inertia body, when a predetermined limiting level of acceleration of the shaft is exceeded, lags behind the rotary movement of said shaft in opposition to the effect of said spring means, so as to bring the locking pawl into engagement with said ring of teeth, the improvement which comprises, said inertia body having an actuating slot forming a cam track therein, and said locking pawl having first and second end regions connected by a web and being inset in said flange, the first end region being provided with a mounting head in the form of a part-disc, which disc is held against radial movement by a bearing space of a part-circular configuration forming part of a recess, said disc forming, in conjunction with said bearing space, a pivot mounting for connecting said locking pawl to said flange, one end of said bearing space continuing into a radial or substantially radial abutment face which forms a buttress for said locking pawl when the latter is in the locking position, said buttress being deformable under excessive loads, the second end region, which is opposite to said first end region, carrying an actuating pin, parallel to the axis of the device, which engages in said actuating slot in said inertia body, said actuating slot following a path along an arc of a circle eccentric to said inertia body.

2. A device according to claim 1, wherein said locking pawl is made up of a plurality of parts of similar outline, said parts having aligned bores and said actuating pin having a clearance fit in said bores, and wherein said actuating slot is in the form of a groove having a floor for securing said actuating pin against axial displacement in one direction while said pin is secured in the other direction by said flange.

3. A device according to claim 1, wherein said locking pawl is made up of a plurality of parts of similar outline, said parts having aligned bores, and said actuating pin having a clearance fit in said bores, and wherein said actuating slot is in the form of a groove having a floor for securing said actuating pin against axial displacement in one direction, while said pin is secured in the other direction by a step in the circumference thereof.

4. A device according to claim 1, further comprising, a winding-up spring connected to said shaft at the end thereof remote from said flange, for reeling in the belt when it has been withdrawn, a non-rotatable housing made of resilient material and having a central bore for accommodating said spring, which is connected to the end of said shaft adjacent said spring, the latter arranged in said non-rotatable housing, and the end of said shaft adjacent said spring having a collar, extending in a circumferential direction, and being insertable through said central bore in said non-rotatable housing because of the elasticity of the latter, and said collar, when in the fitted state, fitting said end of said shaft, behind said non-rotatable housing in the region of said bore.

5. A device according to claim 1, wherein said inertia body includes a hole for mounting thereof on said shaft, and wherein an axially projecting distance piece at least partly encloses the area occupied by said mounting hole, said distance piece being situated on the side of said inertia body adjacent said flange and resting against said flange.

6. A device according to claim 1, wherein said locking pawl is assembled from at least two parts of identical outline.

7. A device according to claim 6, wherein the parts of said pawl are connected by a grooved pin having an outwardly projecting part which forms said actuating pin.

8. In a winding-in device for safety belts of the type including a housing provided with a ring of teeth, a shaft, rotatably mounted in the housing for carrying a safety belt, a locking pawl connected to the shaft for engaging said ring of teeth, and means for moving said pawl into engagement with said ring of teeth when angular speed or acceleration of the shaft exceeds a predetermined limiting value, the improvement which comprises, said locking pawl being breakable under a predetermined load while the locking interengagement with said ring of teeth is preserved, said locking pawl having two opposing end regions, one end region thereof being pivotally mounted on said shaft and the other end region being connected to said moving means for moving the pawl into locking engagement with said ring of teeth, and a web between said end regions, said web being smaller in size than the other parts of said pawl, and forming an intended break point.

9. A device according to claim 8, wherein said locking pawl comprises a locking tooth adjoining said web for engagement of said ring of teeth, and said web has a minimum cross-section in the region of transition to said locking tooth.

* * * * *